R. S. MORISON & B. B. CUSHING.
SAWMILL.
No. 4,395.
PATENTED MAR. 7, 1846.
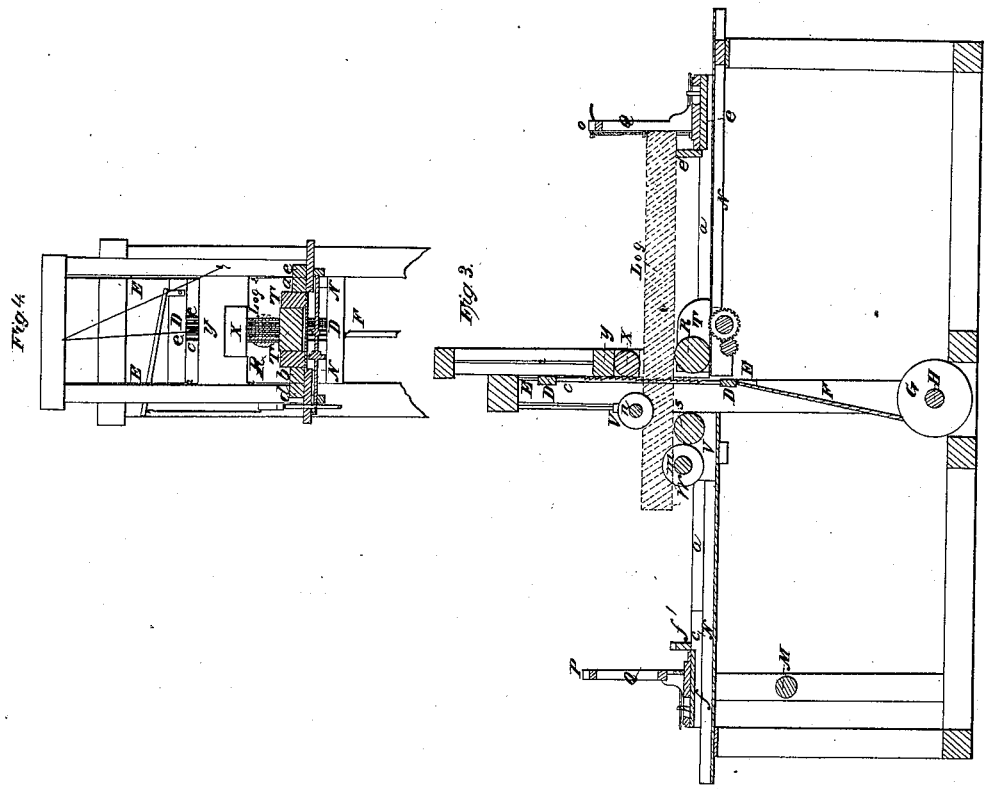
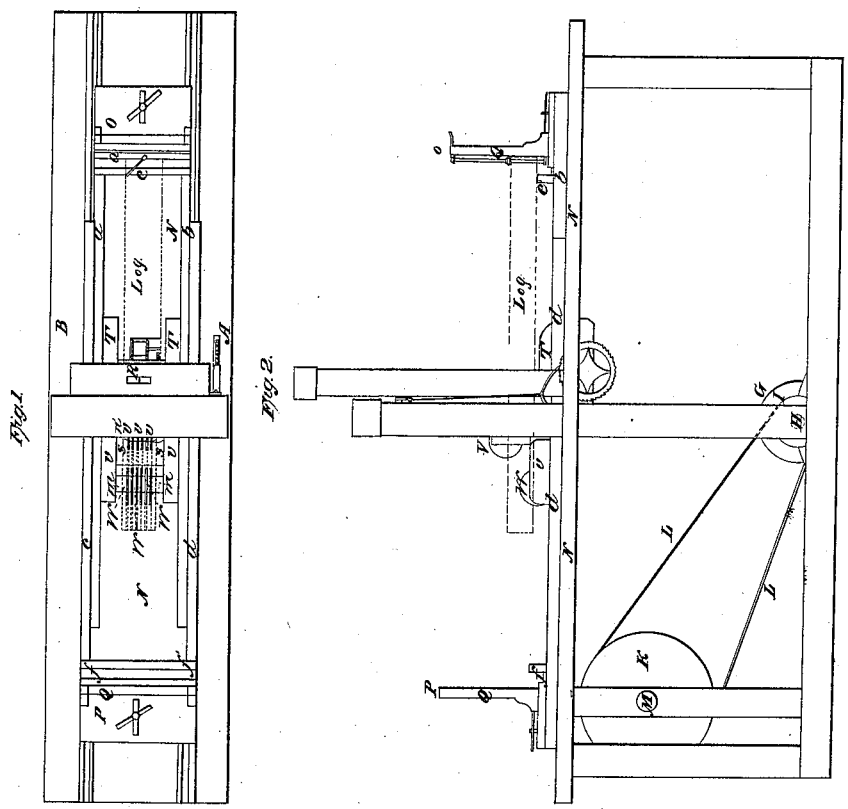

UNITED STATES PATENT OFFICE.

R. S. MORISON AND BENJA. B. CUSHING, OF FRANKFORT, MAINE.

SAWMILL.

Specification of Letters Patent No. 4,395, dated March 7, 1846.

*To all whom it may concern:*

Be it known that we, RUSSELL S. MORISON and BENJAMIN B. CUSHING, of Frankfort, in the county of Waldo and State of Maine, have invented a new and useful Improvement in Mills or Machinery for Sawing Logs into Boards, Planks, Joists, or Various other Kinds of Timber; and we do hereby declare that the nature of our invention and the manner in which it operates are fully set forth in the following description and accompanying drawings, letters, figures, and references thereof.

Of the drawings above mentioned, Figure 1 denotes a top view of our sawing machinery, Fig. 2 a side elevation thereof, Fig. 3 a central, vertical and longitudinal section of it and Fig. 4 a vertical and transverse section of it taken at A, B in Fig. 1, and so as to exhibit the gang of saws and saw frame and various other parts to be hereinafter described.

The main feature of novelty in the mechanism hereinafter described consists in the employment and use of two carriages in connection with a gang or collection of saws, the said carriages serving to partially sustain and force and draw a log (to be sawed) forward in a very peculiar manner, in order that the saws may act upon it and divide it into boards or plank as may be required. The manner in which the said carriages, saws and various other mechanism are arranged and operate with respect to each other, we shall now proceed to explain.

C, C, C, Figs. 3, 4 denote a gang or series of saws disposed parallel to each other and in a frame D, the said frame being arranged and made to play upward and downward between cheeks or vertical timbers E, E in a manner substantially similar to the saw frame of a common saw mill. In this case the said frame is raised and lowered by the revolutions of a crank or crank pulley G, acting on a connecting rod F which (rod) is jointed in a suitable manner to the crank pulley and frame. The crank pulley is placed upon a horizontal shaft H, the position of which is represented in Fig. 3. The said shaft is revolved by means of two pulleys I K, and a band L passing around them (see Fig. 2) the pulley I being arranged and fixed upon the shaft and the pulley K being fixed upon a transverse driving shaft M, situated at any convenient part of the machine. N, Figs. 1, 2 represents the floor of the mill or building in which our machinery is set up. Upon this floor two carriages O, P, are arranged. Each of the said carriages consists of two long timbers or rails (*a*, *b*, of the one and *c*, *d*, of the other) placed parallel to each other and united to a transverse platform *e* of the one or *f* of the other. The two timbers *a*, *b*, of the carriage O are disposed between the timbers *c*, *d* of the carriage P and the said timbers and their carriages are arranged with regard to each other and the saws, in all respects as exhibited in the drawings.

It is calculated that the timbers *a*, *b* of the carriage O shall move within the timbers *c*, *d* of the carriage P. Each of the said carriages is to have a gallows frame Q erected or placed and secured upon it and the said frame is to have any proper mechanical contrivance or contrivances applied to it for the purpose of securing one end of the log to be sawed to the carriage.

R and S are two cylindric revolving rollers the former being arranged just in advance of the saws and sustained between and by bearings or cheeks T, T, resting upon and bolted to the flooring N. The roller S is placed just in rear of the saws, and revolves between cheeks U, U, the positions of the said rollers being represented in Fig. 3. Just above the roller S and between it and the gang of saws we place a series of rotating circular guide plates V V &c. Another series of said guide plates W, W &c. is placed just in rear of the roller S as seen in Figs. 1, 3. Each series is made up of a number of circular plates corresponding to the number of saws in the gang. The said plates of each series are mounted on a horizontal shaft *m* of one and *n* of the other and placed or arranged at distances apart from each other respectively corresponding to the distance of the saws apart from each other. The shaft *m* is placed somewhat below the plane of the bottom of the log to be sawed while the shaft *n* is placed somewhat above the top of the log. The position of a log while being sawed is denoted in the figures by red lines. Each of the saws of the gang has one of the circular plates of each series arranged in the same vertical plane with it, each of the said plates in plane with the saw being of the same thickness as the saw. Consequently, as the log advances beyond the saws during the operation of sawing through it the circular plates of each series will enter within the passages or paths of the saws made in the log and will sustain the boards or divisions of the log in their correct vertical positions. The end of the log upon which the saws first operate is received upon and sustained by the roller S when the log passes beyond the saws. As logs to be sawed vary in their vertical thickness it is advisable to have the upper gang or series of circular plates arranged in a frame which can be raised and lowered by machinery or any other proper means, so as to bring the series of plates to the correct position to enter any log whatever may be its thickness. By the employment of such a frame or contrivance, we are enabled to use circular plates much smaller in their diameters than would otherwise be advisable.

When a log is to be "sawed up" one end of it is placed on the roller R, and the other end upon a transverse rest block e' of the carriage O and confined to the carriage by the holding apparatus of its gallows frame before mentioned. The carriage is next put in motion in such manner as regularly and progressively to force the log toward the gang of saws. The saw being set in motion at the same time will therefore enter the log, and as the log advances will cut into it. When the end of the log so cut by the saws has advanced to a sufficient distance beyond them and the lower series of circular guide plates W, W, &c., the carriage P is moved toward the log in such manner as to receive the said end upon its rest block f' and within its gallows or holding frame Q. This being accomplished the said end of the log is to be fastened or secured to the carriage P by its fastening apparatus (whatever it may be) and at the same time the opposite end of the log is to be unfastened from the carriage. The carriage P is then to be put in motion in such manner as to regularly and progressively draw the log against the saws. At the same time a motion in the opposite direction is given to the carriage O, so as to cause it or its platform to recede from the saws and to come into the correct position to receive the rear end of the next log to be sawed. While the carriage P draws the log forward, the saws will perform their office upon it (the log) until they reach and pass through its rear end, or that end which was hereintofore described as fastened to and unfastened from the carriage O. The operation of cutting through the log being completed it will be drawn forward by the carriage P to such a distance beyond the saws as may be necessary to remove it. The carriages thus are made to alternately approach toward and recede from each other, and by the aforesaid mode of procedure it will be seen that the rear end of the log is entirely sawed through. Besides the above advantage of sawing entirely through the rear end of the log, we obtain another and very important one, viz, a great saving of time which is commonly wasted in ordinary saw mills having but one carriage. This may be illustrated as follows. The carriage O forces the log forward in distance but about one half of its (the log's) length, whereas, in the common saw mills the log is forced forward by the carriage nearly, if not entirely its (the log's) whole length. Therefore, when the carriage returns to receive another log, it must return a distance about equal to the length of the log. In our machine it is made to return only about one half the length of the log. Consequently, as it will be readily seen by those who work in saw mills, a considerable time will be saved in the completion of the operations of sawing.

We do not deem it necessary to describe any particular machinery by which we cause the carriage to move toward and from the gang of saws or each other in the manner as above mentioned, some parts of such mechanism being exhibited in the drawings. We do not claim such as making any part of our invention, and we calculate to avail ourselves of any known mechanism for producing such movements. Neither do we deem it necessary for us to give any minute description of any mode of attaching either end of the log to the carriage in which it is to be sustained as we intend to avail ourselves of any convenient and suitable mechanism. We also intend to make use of any available and proper means or machinery for keeping or holding the log down upon its sustaining rollers R S whether such mechanism consists of a heavy or weighted roller X arranged within a frame Y (see Figs. 3, 4) made to slide up and down between cheeks or posts Z, Z or of any other contrivance.

Having thus described our invention what we claim as new is—

1. The combination of the two carriages O, P, and sustaining rollers or other mechanical equivalents with one or more saws C, C &c. the whole being arranged and operated substantially as specified.

2. We also claim the employment and use in combination with the saws and carriages of one or more series of circular or other proper shaped revolving guide plates V V &c., W W &c., the same being for the purpose of preserving the boards or sawed sections of the log in their vertical or true positions as above explained.

In testimony whereof we have hereto set our signatures, this third day of December A. D. 1845.

RUSSELL S. MORISON.
BENJA. B. CUSHING.

Witnesses:
JOHN PAGE,
T. A. NESMITH.